United States Patent

[11] 3,602,204

| | | |
|---|---|---|
| [72] | Inventor | Albert Grosseau<br>Chaville, France |
| [21] | Appl. No. | 839,537 |
| [22] | Filed | July 7, 1969 |
| [45] | Patented | Aug. 31, 1971 |
| [73] | Assignee | Societe Anonyme Andre Citroen<br>Berliet, Panhard, France |
| [32] | Priority | July 8, 1968 |
| [33] | | France |
| [31] | | 3526 |

[54] INTERNAL-COMBUSTION ENGINE INLET MANIFOLD
9 Claims, 5 Drawing Figs.

[52] U.S. Cl. .................................................. 123/52 M,
123/59 A
[51] Int. Cl. .................................................. F02b 25/26,
F02b 75/10, F02b 27/00
[50] Field of Search ................................................ 123/52 M,
59 A

[56] References Cited
UNITED STATES PATENTS

| 3,019,781 | 2/1962 | Kolbe .......................... | 123/52 X |
| 3,457,904 | 7/1969 | Roberts ....................... | 123/52 X |

FOREIGN PATENTS

| 230,165 | 3/1923 | Great Britain ................ | 123/52 M |
| 1,187,343 | 3/1959 | France ......................... | 123/52 M |

Primary Examiner—Wendell E. Burns
Attorney—Karl F. Ross

ABSTRACT: An inlet manifold for an internal-combustion engine comprises a chamber having a circular aperture in the top surface thereof through which aperture gaseous fuel is fed from a carburetor. Two adjacent sidewalls of the chamber are disposed at an angle not greater than 90° and are joined by a curved portion, the axis of which coincides with the axis of the circular aperture. The entrance portions of passages which lead from the chamber to the respective cylinders of the engine are rectangular in cross section and the axes thereof converge towards the axis of the circular aperture. The cross section of each passage progressively changes so as to be circular at the outlet end, and the entrance portion of each passage is located on the same side of a plane containing the axis of carburetor and the axis of the throttle valve in the carburetor.

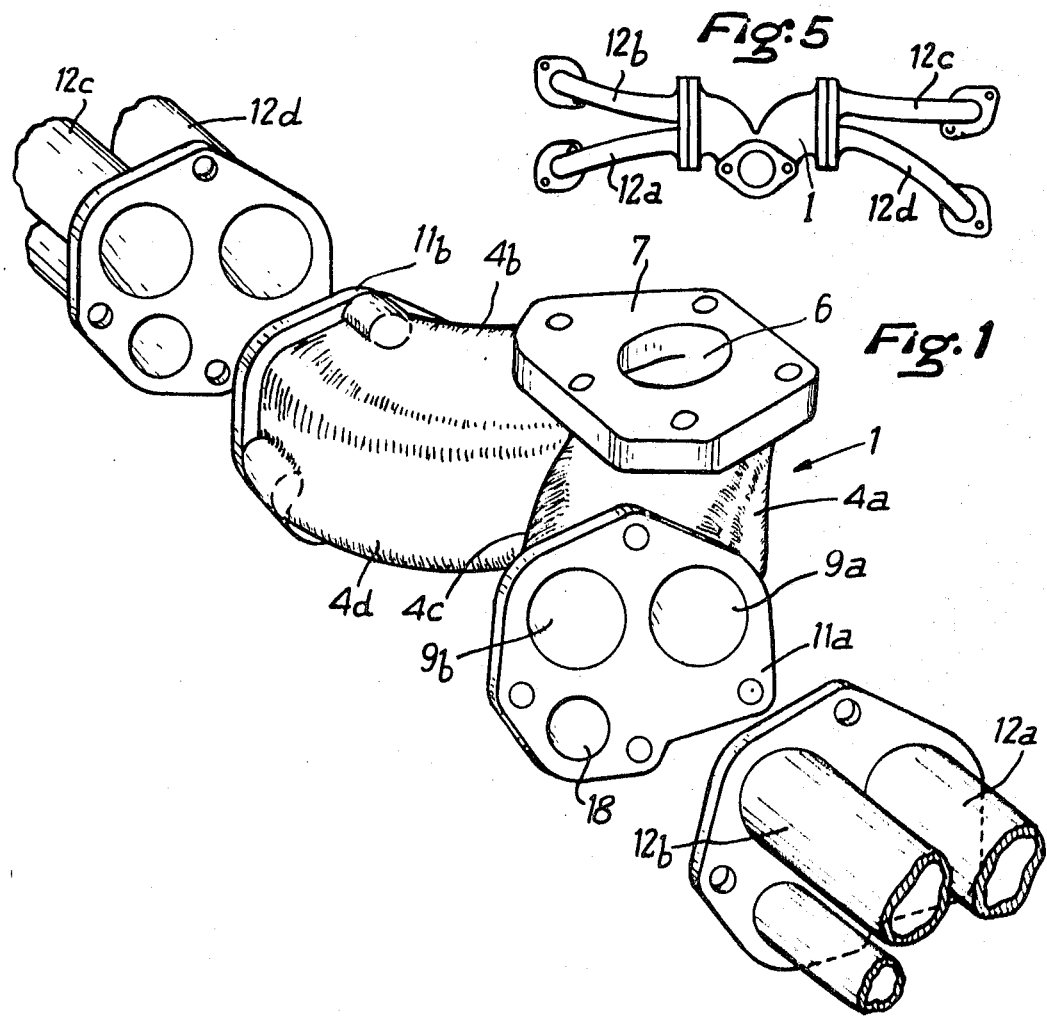

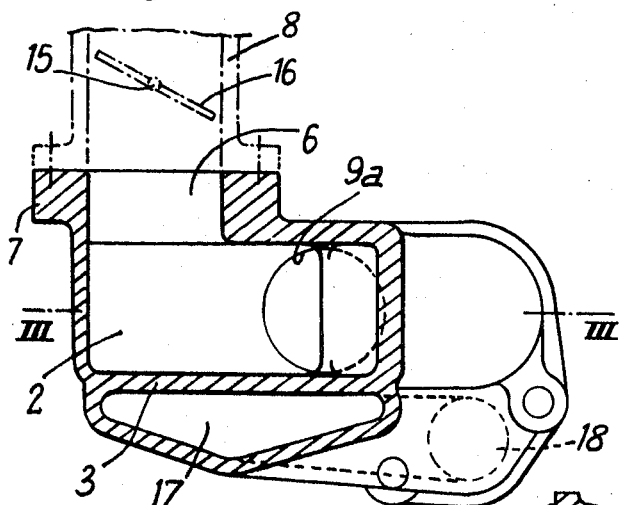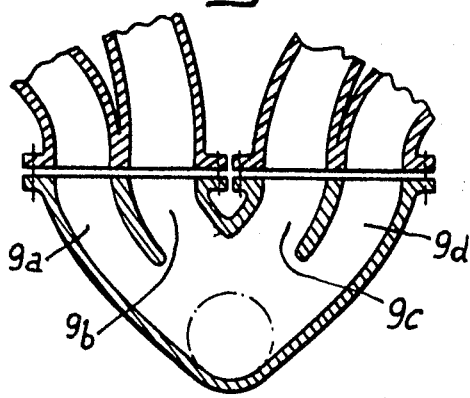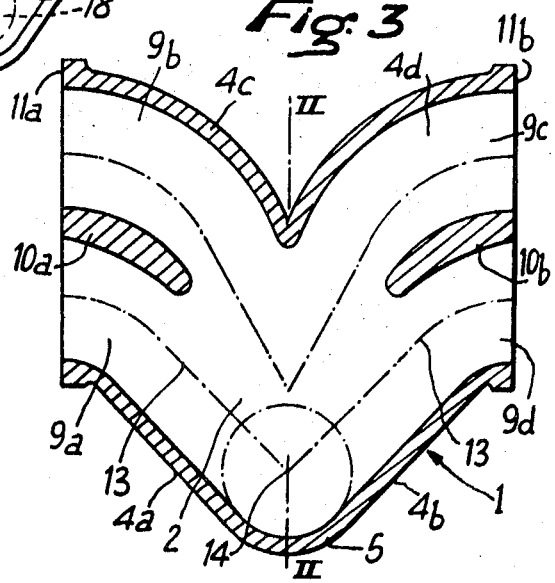

INTERNAL-COMBUSTION ENGINE INLET MANIFOLD

FIELD OF THE INVENTION

The present invention relates to an inlet manifold for an internal-combustion engine.

DESCRIPTION OF THE PRIOR ART

On internal-combustion engines having at least three cylinders which are to be fed from separate inlet pipes from a single vertical carburetor, there generally comprises pipes which branch from a common manifold supplied with gaseous fuel from the carburetor.

In a carburetor whose delivery is governed by the opening of a pivotal throttle valve it is found that the latter channels the flow of gaseous fuel produced by the choke tube into two streams, one of which, aided by the inclination of the throttle valve, has a greater delivery volume than that of the other stream, the two streams being equal only when the throttle valve is fully open, i.e. vertical.

In order to obtain strictly identical feed to all of the cylinders of the engine at speeds where the throttle valve is not fully open, it must be possible for the two streams to join and merge intimately, and as quickly as possible after the throttle valve but before reaching the entrance of each of the inlet pipes, and these entrances must themselves be as close as possible to the carburetor outlet so that the gases can pass into the pipes at maximum speed.

SUMMARY OF THE INVENTION

According to the invention there is provided an internal-combustion engine inlet manifold, comprising means defining a chamber, said means including the inner surface of two interconnected sidewalls, the angle between the inner surfaces not exceeding 90°, and the said walls being connected by a curved wall, means defining a gaseous fuel inlet leading into the top of the chamber from the barrel of a carburetor having a pivotal throttle valve; and means defining a plurality of passages extending from the chamber whereby gaseous fuel flows from said chamber through said passages to the cylinders of the engine, the axes of the entrance portion of the passages converging towards the axis of the gaseous fuel inlet.

BRIEF DESCRIPTION OF THE DRAWINGS

Embodiments of the invention will now be described, by way of example, with reference to the accompanying drawing, in which:

FIG. 1 is a view in perspective of an inlet manifold;

FIG. 2 is a vertical section taken along line II—II of FIG. 3;

FIG. 3 is a horizontal section through the manifold taken along line III—III of FIG. 2;

FIG. 4 is a view, similar to FIG. 3, of a modified form of manifold; and

FIG. 5 is a diagrammatic plan view of the manifold shown in FIGS. 1 to 3.

As shown in FIGS. 1 to 3, a manifold 1 comprises a chamber 2, having a flat and substantially horizontal bottom wall 3 and sidewalls 4a and 4b which are joined together by a curved portion 5. Adjacent the portion 5, the walls 4a and 4b are substantially planar and vertical, the angle between the walls 4a and 4b being not larger than 90°. Remote from the portions, the walls 4a and 4b which are of constant thickness, are outwardly curved and become partly circular. A flange 7 having an aperture 6 is disposed above the chamber 2 and is arranged to be connected to the base of a carburetor 8. The aperture 6 is partly bounded by the portion 5, and has substantially the same internal radius as the barrel of the carburetor 8, so that the chamber 2 constitutes an extension to the carburetor, as shown in FIG. 2. The axes of the portion 5, and the aperture 6 are substantially coincident.

The manifold comprises two further sidewalls 4c, 4d opposite to the walls 4a, 4b respectively. The walls 4c, 4d are joined by a substantially vertical V-shaped portion. At their junction, the walls 4c, 4d are substantially planar, but become curved and partially circular remote from the junction. The walls 4a and 4c define two inlet passages 9a and 9b which are separated from one another by an internal partition 10a; likewise, the walls 4b and 4d define two inlet passages 9c and 9d which are separated from one another by an internal partition 10b. The internal partitions 10a and 10b take the form of two thin and substantially vertical curved ribs whose leading edge is rounded and which are substantially parallel to the walls 4c and 4d respectively. The cross section of the inlet passages 9a, 9b, 9c and 9d progressively changes and becomes circular at the end thereof remote from the chamber 2. At that end, the passages are bounded by flanges 11a, 11b respectively, to which can be attached inlet pipes 12a, 12b, 12c and 12d respectively, which lead to the respective cylinders of the engine. At the entrance thereof each of the passages 9a...9d is of rectangular section having rounded off corners. The flat bottom wall 3 of the chamber 2 extends inside the passages; the section of the passages then gradually develop, while retaining a constant surface area, until when at right angles to the respective connecting flange 11a or 11b, they are of a circular section of the same radius as the inlet of the pipes 12a...12d. This development in the shape of the section can be obtained, for instance, by gradually increasing the radius of the rounded corners.

The axes 13 of the passages 9a...9d at the entrance thereof converge towards the vertical axis 14 of the chamber 2 and are angularly spaced by the same angle. The carburetor 8 is fixed to the manifold 1 so that the axis 15 of its throttle valve 16 which is horizontal, is at right angles to the vertical plane of symmetry of the axes.

It will be seen from the foregoing description that the entrances of the passages 9a...9d which have the same dimensions, are distributed symmetrically on either side of the plane of symmetry of the axes, and are very close to one another, since they are only separated by a relatively thin partition 10a or 10b, or the junction between the walls 4c and 4d; their planes are vertical and substantially equidistant from the axis 14. The axes of the entrance portion of the passages are located on the same side of a transverse plane passing through the vertical axis 14 and through the horizontal axis 15.

In operation, the two streams of gaseous fuel which pass on either side of the throttle valve 16 rejoin and are equally fed to each of the inlet passages 9a...9d irrespective of the extent of the throttle opening.

Indeed, the relatively small angle between the two walls 4a and 4b, which is equal at most to 90°, causes an angular shift of the stream which is very small and assists in directing the stream of fuel to the passage through which the intake has to be effected.

This advantage, as well as that resulting from the proximity of the entrance to the passages is utilized when the manifold is supplying a four-cylinder engine, either an in-line, a V or a flat engine, having a firing order of 1, 3, 4, 2, the passages 9a, 9b, 9c and 9d being assumed to feed respectively the first cylinder, the second, the third and the fourth. FIG. 5 shows the order in which the cylinders are numbered in the case of a flat engine.

Thus, the stream of fuel sweeps from the passage 9a to 9c, then from passage 9c to 9d; the stream of fuel then changes its direction of sweep and sweeps from passage 9d to 9b, and thence from 9b to 9a to commence a new cycle whereat the direction of sweep changes again. It will at once be seen that each change of direction occurs after admission to one of the furthest passages 9a or 9d and that it is assisted by the sidewall close to the respective passage.

As shown in FIGS. 1 to 3, the outlet of each of passages 9a and 9b is directed parallel to but in the opposite direction to the outlet of each passage 9c and 9d; the manifold being intended for use with a flat four-cylinder engine.

As shown in FIG. 4, the outlet of each passage 9a, 9b, 9c and 9d is in the same plane and the manifold is intended for use with a four-cylinder in-line engine. On comparing the manifold shown in FIGS. 3 and 4 it will be seen that the fuel flow inside the manifold will be the same.

Beneath the bottom wall 3 of chamber 2 is provided a heating duct 17 which is extended by two pipes 18 beneath the inlet passages. The duct and the pipes 18 can be provided either in the manifold itself, or in an auxiliary casing fixed under the manifold 1.

The manifold, in accordance with the invention can be used with engines having more than four cylinders, one inlet passage being provided for each cylinder. However, the size of the chamber 2 should not be excessively increased even though a larger number of passages will be incorporated into the manifold. The chamber in effect forms an extension to the carburetor and it is desirable that the velocity of the stream of gaseous fuel should not be reduced therein.

What is claimed is:

1. An internal-combustion engine inlet manifold assembly, comprising a carburetor having a flap-type throttle valve pivotal about an axis, means defining a chamber, said means including inner surfaces of two interconnected sidewalls including an angle of at most 90°, and the said walls being connected by a curved wall; means defining a gaseous fuel inlet lying in a first plane transverse to the inlet axis leading into the top of the chamber from said carburetor; and means defining a plurality of passages extending from the chamber whereby gaseous fuel flows from said chamber through said passages to the cylinders of the engine, the axes of the entrance portion of the passages converging towards said inlet axis and toward a second plane of symmetry of the means defining said plurality of passages, said axis of said throttle valve being perpendicular to said second plane, the entrance portion of each of the passages being located on the same side of a third plane containing the axis of the barrel of the carburetor and the axis of the said throttle valve.

2. A manifold according to claim 1, wherein the bottom of said chamber is substantially flat and substantially horizontal.

3. A manifold according to claim 1, wherein the gaseous fuel inlet is circular and the diameter of said circular inlet corresponds to the diameter of the barrel of the said carburetor.

4. A manifold according to claim 3, wherein the axis of said circular inlet and the axis of the barrel of the said carburetor are substantially coincident.

5. A manifold according to claim 1, wherein the entrance portion of each of said passages from said chamber is rectangular in cross section and wherein the cross section of each passage progressively changes along the length thereof to become circular at the exit.

6. A manifold according to claim 1, wherein the angle between the axes of the entrance portion of adjacent passages are equal.

7. A manifold according to claim 1, wherein the outlets of said passages are parallel.

8. A manifold according to claim 1, wherein the outlets of said passages are located in the same plane.

9. A manifold according to claim 1, further comprising means defining a preheating duct beneath the bottom of said chamber.